United States Patent

Wallis

[11] 3,899,283
[45] Aug. 12, 1975

[54] APPARATUS FOR EXTRUDING RESIN FILM WITH WEAKENED TEAR LINES

[76] Inventor: Marvin E. Wallis, 20741 Horace St., Chatsworth, Calif. 91311

[22] Filed: Jan. 15, 1973

[21] Appl. No.: 323,992

[52] U.S. Cl.............. 425/461; 425/467; 264/176 R
[51] Int. Cl............................................. B29d 7/04
[58] Field of Search .......... 425/297, 326, 461, 467, 425/66, 325; 264/176 R, 210 R; 53/140

[56] References Cited
UNITED STATES PATENTS

| 299,591 | 6/1884 | Stadler | 425/461 X |
|---|---|---|---|
| 1,025,133 | 5/1912 | Dunning | 425/461 |
| 2,774,106 | 12/1956 | Bethe | 425/461 X |
| 3,085,289 | 4/1963 | Van Riper | 425/376 X |
| 3,297,809 | 1/1967 | Wallis | 53/140 X |
| 3,387,328 | 6/1968 | Winstead | 264/176 R X |
| 3,451,103 | 6/1969 | Aykanian et al. | 425/326 R X |
| 3,455,755 | 7/1969 | Phillips | 425/291 X |
| 3,527,859 | 9/1970 | Fairbanks | 425/297 X |
| 3,535,409 | 10/1970 | Rohde | 425/326 R X |
| 3,557,271 | 1/1971 | Fairbanks | 425/297 X |
| 3,687,592 | 8/1972 | Miyamoto et al. | 425/461 X |
| 3,823,053 | 7/1974 | Straub et al. | 425/461 X |

Primary Examiner—R. Spencer Annear
Attorney, Agent, or Firm—Watts, Hoffmann, Fisher & Heinke Co.

[57] ABSTRACT

In a packaging method and apparatus, a film forming head is provided with a thin lipped extruding orifice communicating with a central cavity for receiving liquid resin material therein and for extruding a molten sheet of resin film. The extruded film, while still molten, is directly applied to the articles to be packaged. To facilitate the opening of a package formed in this manner, weakened tear lines are automatically formed in the extruded plastic sheet by the provision of small obstructing pins placed at or adjacent the extruding orifice of the head. The weakened lines in the extruded film may be formed as individual easy opening tear lines, or as double tear lines in which a strip of plastic wrapping may be conveniently stripped away from the remaining resin film to facilitate removal of the wrapper. Except for the weakened tear lines, the extruded film is formed with biaxially oriented strength characteristics. The film is projected radially outwardly of the orifice from a central cavity within the head to achieve this biaxial orientation. The location of the easy tear line or lines may be selected by appropriate positioning of the flow obstructing pins relative to the extruding orifice.

11 Claims, 7 Drawing Figures

PATENTED AUG 12 1975 3,899,283

SHEET 1

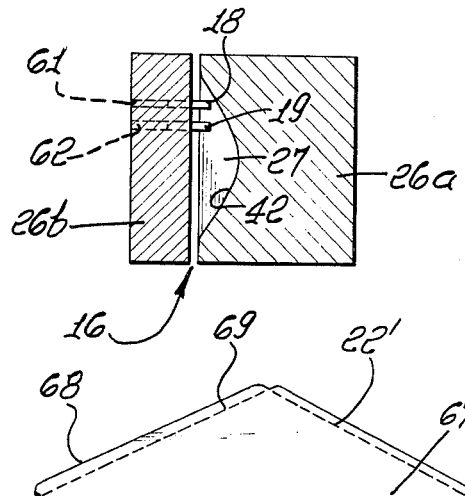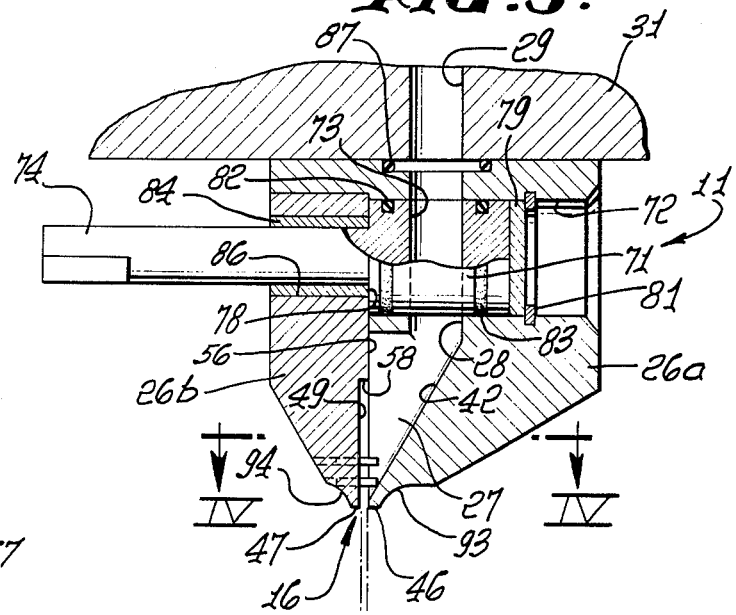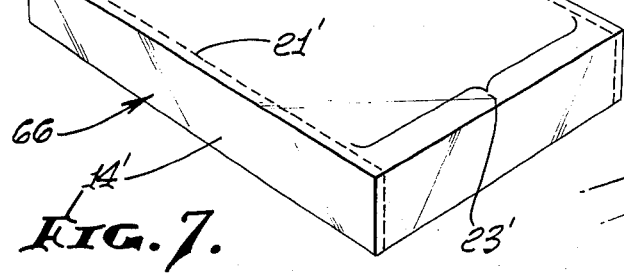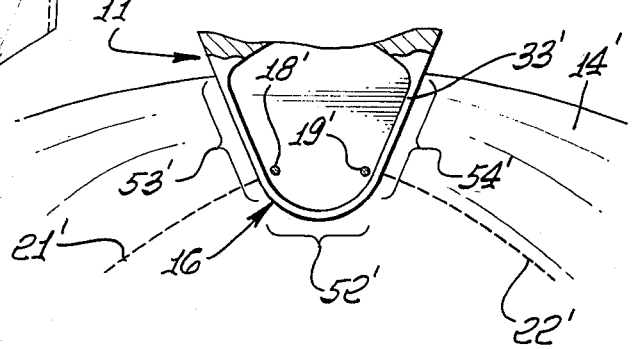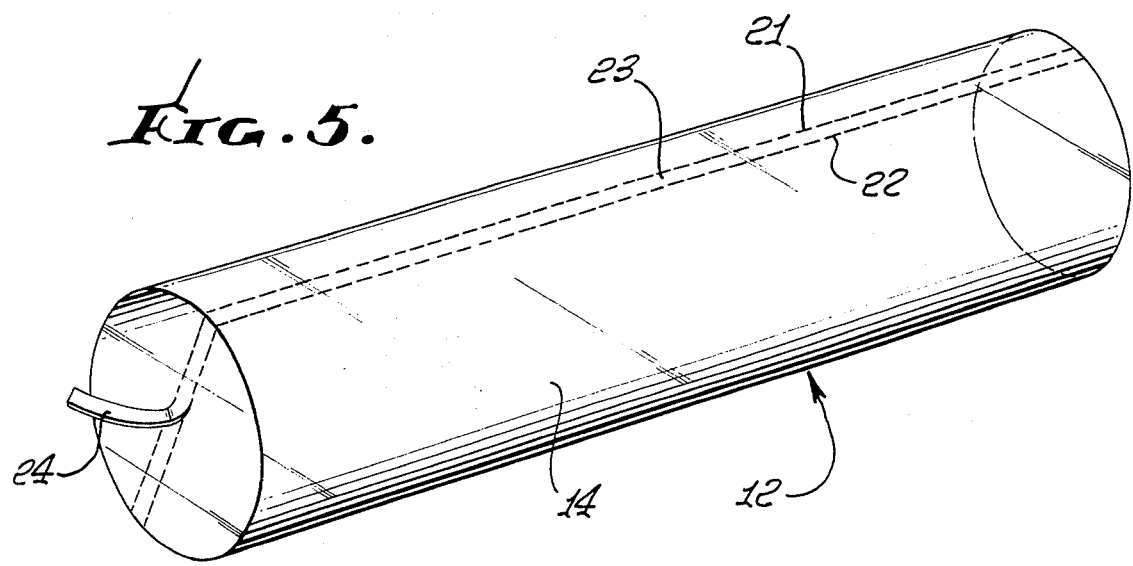

APPARATUS FOR EXTRUDING RESIN FILM WITH WEAKENED TEAR LINES

BACKGROUND OF THE INVENTION

In general, the present invention relates to the forming of plastic or resin material into a sheet or film for packaging. More particularly, the present invention concerns a packaging method and apparatus in which easy opening tear lines are automatically formed in an extruded film or sheet or resin material such as used in wrapping packages.

The wrapping of retail articles in a film of plastic resin material is an especially convenient and advantageous packaging technique. The plastic film wrap shields the goods, especially foodstuffs, from contamination and yet the wrap may be transparent to permit visual inspection of the contents by the customer. Depending upon the contents of the package, it is many times advantageous to provide tough and relatively thick plastic wrappers to insure adequate protection of the goods from contamination, damage, etc. For example, resin films having biaxially oriented strength characteristics have been developed for resisting film tear in all directions of applied force. Such biaxially oriented films are contrasted with linearly extruded films which are susceptible to tear along the direction of extrusion.

However, the stronger and tougher the wrapping is made, the more difficult it is to remove from the packaged article. Consequently, many packages on todays' market are provided with expedients to facilitate the opening or removal of the film. The techniques employed vary depending upon the package and the characteristics of the film wrapper.

One present method provides for implanting or welding a separate strip of plastic or other material to the resin film wrapper. The base film or wrapper may have been previously produced in roll form by well known extrusion processes. Because of cost factors, this method is generally limited to the formation of one tear line along a single implanted or welded strip. Furthermore, this technique cannot be successfully applied to base films of biaxially oriented strength characteristics, since biaxially oriented film will not tear directionally. There is a substantial and equal resistance to tear in all directions in a biaxially oriented film. Thus the implanted or welded strip is normally limited to the use of linearly extruded film, and the strip is typically applied longitudinally with the direction in which the film has been extruded.

Another method entails the formation of the film or sheet itself with a weakened tear line at a specific position on the web of film. This may be accomplished by forming a weakened line or strip in the film as it is extruded into roll film, or forming such a weakened or perforated tear line after the film has been extruded and before or after it has been placed in roll form. This process has also heretofore been limited to linearly or axially extruded film. The reason for this is as follows.

Heretofore, biaxially oriented film has been produced by first linearly extruding molten resin into a film and then stretching or pulling the film in a direction transverse to that of the extrusion. This simultaneous linear extrusion and transverse stretching causes the molecules of the resin material to be stretched or conditioned in biaxial directions thereby providing the biaxial strength orientation. It will be apparent that any attempt to extrude the weakened tear line cannot be controlled because of the simultaneous transverse stretching operation. The transverse stretching tends to erratically displace the tear line such that reliable and uniform results are not obtainable. Similar problems are also encountered in an attempt to form the weakened tear line in a biaxially oriented blown film.

A still further difficulty associated with some of these above described techniques is the inability to apply weakened tear lines or tear strips to certain types of resin film, such as ionomers, e.g., DuPont's Surlyn Film.

SUMMARY OF THE INVENTION AND ITS OBJECTIVES

Accordingly, it is an object of the present invention to provide an improved packaging method and apparatus for forming packages wrapped in a resin or plastic film and provided with an easy opening tear line.

It is another object of the present invention to provide method and apparatus for extruding a biaxially oriented resin film with one or more weakened tear lines.

It is still another object of the present invention to provide for the automatic formation of weakened tear lines in a packaging system of the type in which a molten resin film is extruded and projected to intercept and automatically wrap articles carried by a conveyor underlying the film forming head.

It is an additional object of the present invention to provide a resin film wrapper formed with a pair of spaced parallel easy opening tear lines such that the film material lying between the tear lines may be stripped away from the wrapping to open or partially open the package.

These objects are achieved in accordance with the present invention by a packaging apparatus including an extruding head of the type capable of extruding and projecting a resin film or sheet having biaxially oriented strength characteristics. The extruding head is provided with pin obstruction means mounted in or adjacent an extruding orifice to automatically cause the formation of weakened tear lines in the extruded sheet or film. The extruding head is provided by a head body having a central cavity therein for receiving a viscous resin material under pressure. A thin lip orifice extends about and communicates with a curvilinear portion of the cavity for extruding a thin film radially outwardly from the orifice in a fanned out pattern. The radially directed film extrusion pattern causes the biaxial orientation of the resin material.

One or more pin obstruction means may be mounted at selected locations adjacent or within the extruding orifice so as to partially obstruct or interrupt the outward flow of molten resin material. The partially obstructed or interrupted flow weakens the plastic material along the line or lines formed in the film by the obstructing pin or pins.

A pair of spaced apart pins may be employed to generate double or dual tear lines. An extruded film provided with such dual tear lines may be applied to an article as its wrapper with the strip of material lying between the dual tear lines positioned so that it may be stripped away to expose the article or to permit easy removal of the remaining wrapper.

This film forming head may be used in combination with a packaging apparatus of the type in which a molten sheet or resin material is extruded from a film forming head positioned to overlie a conveyor. Articles to be packaged are transported by the conveyor so as to intercept and be enveloped by the molten sheet or film of resin material as it is extruded and projected downwardly toward the conveyor from the film forming head. The flow obstructing pins are mounted adjacent the orifice of the head to generate one or more easy tear lines in the molten packaging film. By selectively placing these pins, the tear lines can be disposed on the film and deposited on the package as desired. For example, an extruded film formed with the above described dual tear lines can be deposited on each of the articles to be packaged so as to deposit the tear-away strip at a convenient location on the package.

These and further objects and various advantages of the packaging method and apparatus in accordance with the present invention will become apparent to those skilled in the art from a consideration of the following detailed description of certain exemplary embodiments thereof. Reference will be made to the appended sheets of drawings in which:

BRIEF DESCRIPTION OF THE DRAWINGS

FIG. 3 is a vertical sectional view of the film forming head taken generally along the plane III—III of FIG. 2.

FIG. 4 is a horizontal sectional view taken along the plane IV—IV of FIG. 3.

FIG. 5 is an enlarged perspective view of an elongated article packaged in accordance with the present invention and illustrating relatively closely spaced dual tear lines disposed longitudinally of the article.

FIG. 6 is an enlarged vertical sectional view similar to FIG. 2 although here illustrating an alternative embodiment of the invention in which a pair of obstructing pins are disposed to form dual tear lines having a relatively wide separation there between.

FIG. 7 is a tray package or article wrapped in accordance with the present invention and illustrating the placement of the dual tear lines, such as generated by the head of FIG. 6, adjacent opposite lateral edges of the tray.

DESCRIPTION OF THE PREFERRED EMBODIMENTS

Figure 1:
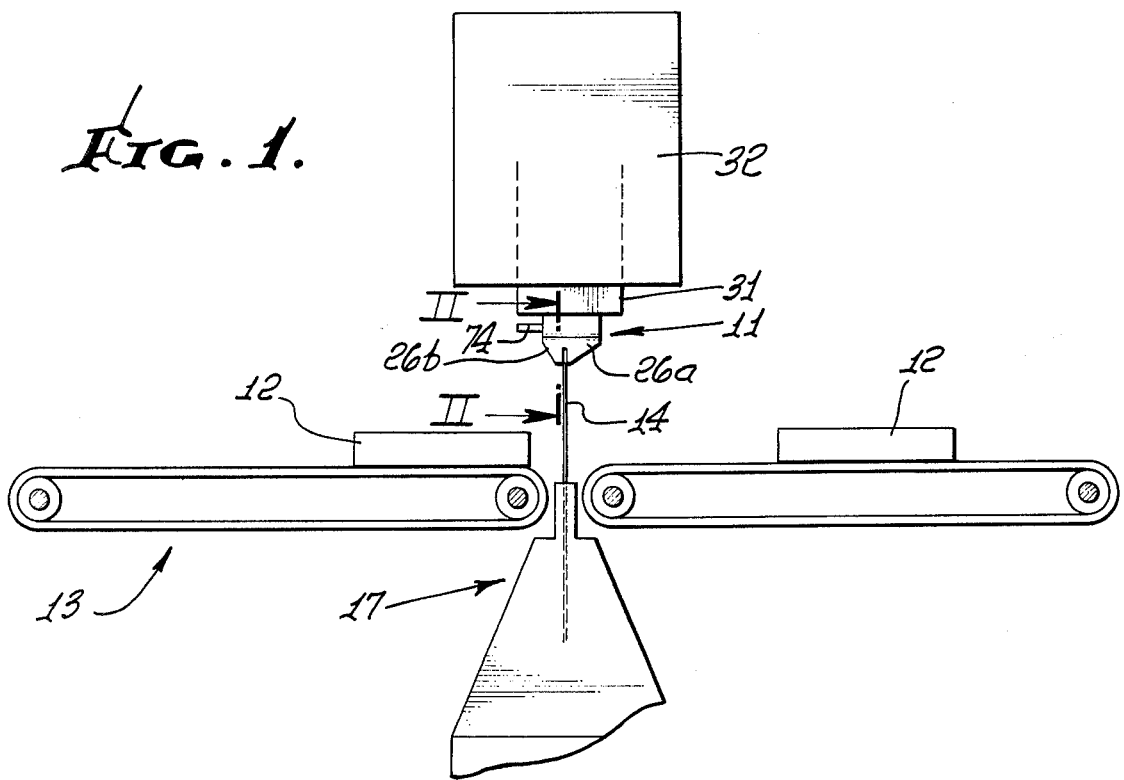
FIG. 1 is a front elevational view of the packaging apparatus illustrated a film forming head of the type employed in the present embodiment of the invention.
Figure 2:
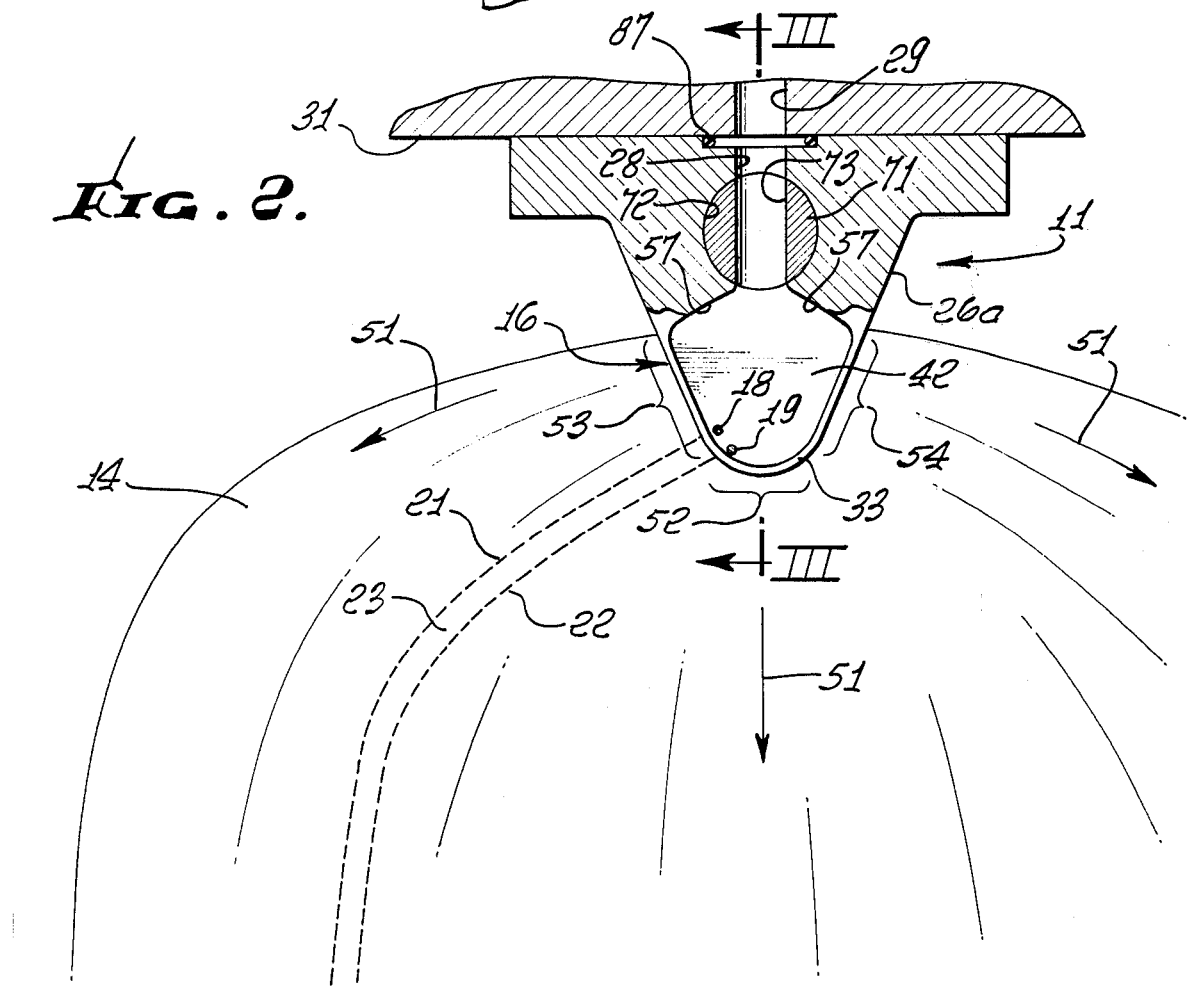
FIG. 2 is an enlarged vertical sectional view of the film forming head of FIG. 1 taken therein along the plane II—II, and illustrating the pin obstruction means located to form weakened tear lines in the extruded film.

With reference to FIGS. 1 and 2, the packaging method and apparatus for extruding resin film with weakened tear lines generally comprises a film forming head 11 overlying a means for conveying articles 12 to be packaged. In this instance, articles 12 are carried by a conveyor 13. In operation, a sheet or film 14 of molten resin material is extruded radially outwardly from a curvilinear thin lipped origice 16 of head 11 with film 14 being projected downwardly toward conveyor 13 as best shown in FIG. 1. The sheet or film 14 thus forms a downwardly depending curtain which is intercepted by each of articles 12 as they pass beneath film forming head 11. This causes each article to be enveloped by the still molten film whereupon the resin sheet material automatically wraps about the article and seals thereto.

A suction means indicated at 17 may be provided at a transverse interruption in conveyor 13 and underlying head 11 to pull and tension the extruded sheet and also to accumulate surplus resin material not applied to the packaged articles.

In this respect, the packaging system shown in FIG. 1 may be of the general type disclosed in U.S. Pat. No. 3,162,897, and more particularly of the type disclosed in my copending application Ser. No. 285,140 filed Aug. 31, 1972 and entitled "Automatic Packaging Method and Apparatus," and my applications Ser. No. 286,116 filed Sept. 9, 1972 and entitled "Film Forming Head," and Ser. No. 285,238 filed Aug. 31, 1972 and entitled "Method and Apparatus for Pre-Conditioning Solid Particle Resin Material for Plastic Forming."

In accordance with the present invention, film forming head 11 is provided with at least one obstruction means for obstructing or partially obstructing the flow of molten resin outwardly of orifice 16 during extrusion of the film. In this instance, a pair of obstruction means are provided in the form of pin members 18 and 19 disposed adjacent orifice 16 to generate a corresponding pair of weakened tear lines 21 and 22 in film 14.

Although any number of tear lines may be generated in this manner by a corresponding number of pin members, such as members 18 and 19, in this instance, two tear lines are formed. Lines 21 and 22 are spaced apart and generally parallel so as to define an elongated strip 23 of material therebetween. Furthermore, pin members 18 and 19 are disposed in this instance relatively close together so that strip 23 is relatively narrow with respect to the overall width of film 14. Film 14 may be automatically applied to articles 12 so that dual tear lines 21 and 22 appear as shown in FIG. 5. As indicated therein, film 14 with dual tear lines 21 and 22 forms an easy opening wrapper on article 12, which in this instance is an elongated article such as a solid cylindrical shaft or a stacked column of paper cups.

The film 14 automatically envelops and seals to article 12 in the manner more specifically described in the above referenced co-pending applications. In accordance with the present invention, the applied film 14 carries with it the dual tear lines 21 and 22 generated by pins 18 and 19 so that a tear-away strip 23 is deposited longitudinally on article 12 as shown in FIG. 5. The strip of material 23 between dual tear lines 21 and 22 may be easily stripped away from the rest of the wrapping by loosening one end of the strip to form a tab 24 as illustrated. Tab 24 may be used to tear strip 23 length-wise of the packaged article and thereby enable easy removal of the remaining film. Of course, this is just one example of many possible package configurations, positions of strip 23, and relative proportions and dimensions of strip 23. Dual tear lines may be generated in any proportion relative to the package as a whole, and may be in general positioned at any desired location on the completed package. As described herein, FIGS. 6 and 7 illustrate an alternative arrangement of the film obstruction pins so as to dispose a pair of parallel tear lines at a relatively wide separation.

Also, the packaged article shown in FIG. 5 may be provided with a release tab affixed as a separate member to strip 23 to initiate its removal, as an alternative to the loosening of tab portion 24.

Although two tear lines are formed in the disclosed embodiments, it is contemplated that a single tear line or more than two tear lines can be generated as required by the package configuration.

As an important feature of the present invention, the automatically generated tear lines are formed in a film 14 which is biaxially extruded. As mentioned above, biaxially oriented film is in most cases preferred because of its resistance to tear in all directions and its overall toughness. Accordingly, film 14 when applied as a wrapping to articles 12 exhibits the usual toughness and tear resistance provided by biaxially oriented film except where desired, namely along the tear lines. Film 14 derives its biaxial orientation from the particular manner in which the molten resin material is extruded by head 11.

As described in my above mentioned co-pending application Ser. No. 286,116, entitled "Film Forming Head," head 11 is provided with a body 26, here in the form of a base 26a and a cap 26b which together define an internal central cavity 27 as best shown in FIGS. 3 and 4. In communication with cavity 27 is an inlet passage provided by a centrally located bore 28, which in the typical mounting of head 11 will extend in a vertical direction downwardly into cavity 27 from an overlying resin supply channel 29 as shown in FIG. 3. Channel 29 is formed in a head support 31 to which head 11 may be mounted. Support 31 may be provided at the lower portion of a reservoir or chamber 32 for temporarily storing resin melt in a position above head 11.

The material suitable for use with head 11 may be any of a variety of thermoplastic or thermosetting resins. In general, the materials most commonly used in the plastic industry and which are suitable for the present invention include polyethylene, polyamides, ionomers and ethylene vinyl acetate copolymers. However, many other polymers and copolymers and highly viscous blends may be employed. For optimum results, the viscosity of the resin melt extruded from head 11 will be generally greater than 1,000 centipoise and as much as 100,000 centipoise. A temperature of 350° to 500°F. is typical for the resin melt introduced into head 11 via channel 29.

The highly viscous plastic or resin melt within chamber 32 is forced under pressure downwardly through the inlet passage of head 11 defined by bore 28 and into cavity 27. From there it is extruded outwardly into a thin film or sheet 14 through gapped orifice 16 which extends circumferentially about a curvilinear portion of the head cavity 27.

The geometrical configuration of cavity 27 and orifice 16 is critical in producing a properly formed film. In general, the head configuration provides for extruding the film over a narrow or thin lip or land 33 separating cavity 27 from the exterior of head body 26. Land 33 is best shown in FIG. 2.

Cavity 27 is shaped so as to define an interior cavity wall 42 in base 26a, wherein this wall is concave curvilinear in a plane passing through the body, in this instance corresponding generally to the plane indicated by section lines II—II of FIG. 1. The concavity of interior wall 42 is best shown in FIG. 2, in which the plane referred to above corresponds to the plane of the drawing sheet. In this same plane and adjacent to cavity 27 is a convex exterior surface portion of head body 26, here in the form of exterior surfaces 46 and 47 of base 26a and cap 26b respectively. These surfaces are proximate and generally parallel to the interior cavity wall 42 within the above-mentioned plane. Thus as best shown in FIG. 2, cavity wall 42 and the exterior surface 46 of base 26a define boundaries of a thin lip or land 33 which itself is elongate and curvilinear in the plane of FIG. 2. Land 33 extends in this plane circumferentially about interior wall 42 and exterior surface 46.

Lip or land 33 defines in conjunction with a confronting recessed face 49 of cap 26b, the gapped orifice 16, as best shown in FIGS. 3 and 4. Orifice 16 is thus comprised of that portion of face 49 which is in registration with land 33. The resin film is extruded outwardly from cavity 27 in a radially fanned out pattern as indicated by arrows 51 in FIG. 2.

To provide a preferred fanning or flaring of the film radially outwardly from head 11 as shown in FIG. 2, interior cavity wall 42 and exterior surfaces 46 and 47 are shaped such that orifice 16 defines a centrally disposed semi-circular portion 52 and a pair of lateral straight side portions 53 and 54. Straight side portions 53 and 54 are generally tangent to central semi-circular portion 52. Thus, orifice 16 extends in its longitudinal dimension within the plane of FIG. 2 circumferentially about semi-circular portion 52 and along straight tangent portions 53 and 54. By this configuration, the film is extruded radially of portion 52 and generally perpendicularly outwardly from straight side portions 53 and 54.

Cavity 27 of head 11 is formed such that the interior cavity wall slopes or converges toward orifice 16. This configuration of the cavity results in a smooth acceleration of the pressure-driven resin melt such that as the melt reaches orifice 16 it has attained a suitable discharge velocity.

In particular, interior cavity wall 42 of base 26a is shaped such that together with a confronting wall 56 and recessed face 49 of cap 26b, cavity 27 is formed with a centermost region of greatest cavity cross section. Here, this region of greatest cross section lies proximate bore 28 and remote from extruding orifice 16. From this centermost location, interior cavity wall 42 slopes in a radially outward direction toward the plane of orifice 16. The sloped contour of wall 42 is such that this wall circumferentially intersects with land 33 at orifice 16 as indicated in FIGS. 3 and 4.

The upper portion of cavity 27 is here bounded by a wall 57 formed in base 26a. Wall 57 extends outwardly from bore 28 toward the upper extent of straight sides 53 and 54 of the orifice. The limits of orifice 16 lie adjacent the upper extent of side portions 53 and 54 and are defined by an upper shoulder 58 of recessed face 49 as shown in FIG. 3. Shoulder 58 may be disposed approximately at the junction of wall 57 with side portions 53 and 54.

In operation, the resin material is accelerated during passage through cavity 27 and is forcefully discharged from orifice 16 at a velocity suitable for providing the fanned out shape of film 14. During this process, pin members 18 and 19 partially obstruct the flow of resin outwardly of orifice 16, automatically creating localized weakening of the material along lines 21 and 22. Although the use of pin members 18 and 19 as disclosed has been found preferable, it will be appreciated that numerous other obstruction means may be employed to accomplish this function. For example, the orifice 16 itself may be formed with small constrictions located along land 33 and serving to partially interrupt or obstruct the flow of resin. Furthermore, the number of obstruction means is limited only by the desired number of weakened tear lines. More or less than the two pin members 18 and 19 shown here may be used.

Although the precise placement of pin members 18 and 19 is not believed to be critical, preferred results seem to be obtained by mounting these members just inside of the lip of orifice 16. In particular, and as best shown in FIG. 2, pin members 18 and 19 are disposed within cavity 27 and proximate to land 33 so that the pins are on the entry side of the orifice. As the resin flows past members 18 and 19 it separates slightly and then partially rejoins as the material enters orifice 16 and is discharged from the discharge side thereof.

In this instance, members 18 and 19 are located within cavity 27 either touching or one to several thousandths of an inch away from the inside edge of land 33.

Pin members 18 and 19 may be mounted in a variety of ways. Here, a pair of mounting holes 61 and 62 are provided within cap 26b extending substantially perpendicularly to the plane of orifice 16 and thus perpendicularly to the planes of face 49 and land 33. Pins 18 and 19 are generally elongated and are inserted within pin mounting holes 61 and 62 so that the axis of the pins also extend perpendicularly or transversely to the plane of orifice 16. Alternatively, pins 18 and 19 may be supported from base 26a by providing mounting holes in the base part corresponding to holes 61 and 62.

The positioning of pin members 18 and 19 and the size thereof may be changed to vary the resulting tear pressure required to separate film 14 along the tear lines. By placing the obstruction means closer to land 33, the interruption of the flow of resin is increased and the resulting tear line is weakened. The pins may be placed so as to extend perpendicularly from or into the face of land 33. However, it is preferable that sufficient land area remain on the discharge side of the obstruction pins so as to allow the film material to partially rejoin during discharge. Thus, although the pin members may be placed even on the outside of head 11 adjacent the discharge or exit side of orifice 16, it is preferred that the obstructing members be disposed inwardly of this point to allow the material to rejoin while still undergoing extrusion.

Normally the obstruction pins may be mounted to project completely across a gapped orifice 16 as illustrated. However, the size of each pin and its position relative to land 33 may be varied so that the projection of the pins across the entire gap is not always necessary or desirable.

As indicated, the number of pin members and the spacing therebetween can be varied depending upon the desired location of the weakened tear lines. With reference to FIGS. 6 and 7, an alternative arrangement of the obstructing pin members is shown in connection with a film head 11'. The tear lines generated by film forming head 11' are in this instance applied to an open top cardboard or plastic tray 66 as illustrated. In FIGS. 6 and 7 primed reference numerals are used to denote corresponding parts shown in FIGS. 1 through 5.

In the embodiment of FIG. 6, obstruction pins 18' and 19' are disposed on opposite sides of the central semi-circular portion 52' of orifice 16' intermediate the circumferential extent of the orifice. This arrangement of the pin members results in a pair of tear lines 21' and 22' having a relative wide separation therebetween so as to be deposited adjacent opposite side edges of the article tray 66 as shown in FIG. 7.

The article or tray 66 is of the type disclosed in my copending U.S Patent application Ser. No. 285,140 entitled "Automatic Packaging." Prior to receiving the wrapping of film 14', tray 66 may have an open top 67 and a rearwardly extending flange 68 disposed along the upper rear edge of the tray. Tray 66 filled with the contents to be packaged is positioned on conveyor 13, as in the case of articles 12, and automatically wrapped by the downwardly projected resin film generated by the film forming head.

Trays 66 are each disposed on conveyor 13 so as to be aligned with film forming head 11' in a predetermined manner. In this instance, the alignment of the packages relative to the head provides for the automatic application or depositing of tear lines 21' and 22' adjacent to and along the side edges of the tray. The outboard portions of film 14 automatically wrap around the sides and bottom of the tray 66 and seal thereto in the manner more fully described in my above mentioned copending U.S. application.

The rearwardly depending flange 68 of tray 66 may be provided with a perforation line 69. This provides a perforated tear opener which may be used to initiate opening of the package. By manually grasping flange 68 and separating it from the end of tray 66, it may be used to tear the film or sheet along lines 21' and 22' to expose the contents of the tray. If desired, the top plastic sheet or film may be torn only part way along the sides to allow the customer to release part or all of the package as desired.

Thus the strip of material 23' lying between weakened tear lines 21' and 22' may be varied by merely changing the relative position of the obstructing means of the film forming head. In FIG. 7, the separation between tear lines 21' and 22' is relatively wide, e.g. 4 to 8 inches. On the other hand, the width of tear-away strip 23 on the article 12 in FIG. 5 may be only onequarter to one-half inches wide. It will be appreciated, that although two particular examples of packages provided with the weakened tear lines are illustrated, any variety, size and shape of articles or packages may be formed.

For example, the article 12 in FIG. 5 is illustrated as an elongated cylinder. However, this article could also be a stacked column of paper cups or the like, or any elongated article or a group of articles.

As disclosed in my copending U.S. application Ser. No. 286,116 entitled "Film Forming Head," it has been found that the angle by which side portions 53, 53' and 54, 54' of heads 11 and 11' slope away from the radial bisector of semi-circular portion 52, 52' is significant. In particular, the slope or angle of straight side portions 53, 53' and 54, 54' determine the amount of fanning of film 14 and 14'. With reference to FIG. 2, side portions 53 and 54 are here sloped tangentially outwardly and away from semi-circular portion 42 at an angle of 20° to 35° relative to the vertical. This causes the film 14 to be projected radially outwardly of cavity 27 and also forwardly or downwardly of semi-circular portion 52.

A greater vertical inclination of side portions 53 and 54 tends to cause the film to fold or bunch along the outboard portions thereof. On the other hand, a greater horizontal inclination of these straight side portions may result in a film which is extruded so fast it is unmanageable.

For the presently disclosed head, in which the radius of semi-circular portion 52 is approximately one-half inch and where sides 53 and 54 are also approximately one-half inch, typical dimensions of the head components are as follows. The width of land 33 may be in the range of 0.01 to 0.08 inches. The diameter of pin members 18 and 19 may be of the same order of magnitude as the width of land 33.

Orifice 16 may have a gap as small as 0.003 or as great or greater than 0.025 inches between the confronting gap faces. As previously indicated, gap 16 is defined by recessed face 49 on cap 26b. The recessed face 49 may be provided by grinding, milling, or otherwise cutting this face on cap 26b.

The width of land 33 may be intentionally different at semi-circular portion 52 relative to the width of the land along side portions 53 and 54. This variation in land width provides an aspect of control over the film extrusion. In this instance, the width of land 33 adjacent portion 52 is 0.04 inches, greater than the 0.03 inches width provided along the side portions of the head orifice. The greater thickness of land 33 adjacent semi-circular portion 52 tends to cause a more even distribution of the film by forcing more of the visous resin material to escape adjacent the narrower lip portions along the sides.

It will thus be appreciated that the relative dimensions of obstruction pin members 18 and 19, the angle of slope of sides 53 and 54, the width of land 33 and the gap spacing of orifice 16 may be adjusted to vary the characteristics of weakened tear lines 21 and 22 of film 14.

The size of obstruction pin members 18 and 19 together with the relative positions thereof will determine the relative thickness of tear lines 21 and 22. The angle of slope of sides 53 and 54 controls the horizontal thrust of the film as does the thickness of width of land 33. An increase of the horizontal thrust or projection of film 14 will react like the wing flaps of an airplane and slow the velocity of film extrusion.

Although head 11 is here disclosed with a unilateral cavity 27 formed substantially by the contoured depression within base 26a, an alternative head construction (not shown) provides for a complimentary cavity or depressed portion within cap 26b. In such case, the interior walls of both the cap and base would appear as interior cavity wall 42 shown here, and would slope toward the extruding orifice. Also in such case, inlet bore 28 may be rectangular or oval in cross section, to match the complimentary interior walls of base 26a and cap 26b so that the flow of plastic into the head cavity and outwardly of its orifice will be smooth and uninterrupted.

Preferably housing 26 is provided with a valve means mounted as closely as possible to cavity 27 to permit abrupt turn-on and turn-off interruption of the flow of viscous resin thereto. Here, as in the case of my copending U.S. application, Ser. No. 286,116 for "Film Forming Head," this is advantageously provided by a valve or cylinder 71 rotatably mounted within a bore 72 extending transversely to and intersecting bore 28. Cylinder 71 is provided with a valve opening 73 extending transversely to the cylinder such that it may be aligned with bore 28 as illustrated in FIG. 2. This accommodates a free flow of resin fluid downwardly into cavity 27. Preferably, bore 28 and valve opening 73 (when open) extend in their longitudianl dimension in general alignment with orifice 16 entering cavity 27 at a location remote from the orifice. This permits a smooth flow of the highly viscous resin directly through cavity 27 to its point of extrusion at gapped orifice 16.

Cylinder 71 may be rotated by an actuator means (not shown) applied to an axial stem 74. Approximately one-quarter of a turn of cylinder 71 causes a misalignment of opening 73 and thereby closes or blocks the inlet passage defined by bore 28. Cylinder 71 thus functions as a valve.

To retain cylinder 71 within head 11, an axial end of the cylinder adjacent stem 74 abuts against an end wall 78 of bore 72, while the other end of cylinder 71 abuts against an annular spacer 79. A retainer ring 81 is mounted within bore 72 as illustrated in FIG. 3 to secure spacer 79. Sealing means here in the form of spring loaded or standard O-rings 82 and 83 circumferentially extending about cylinder 71 are provided to prevent the escape of fluid outwardly of bore 72. This area between O-rings 82 and 83 may be tapered with the spring loaded or standard O-rings located at both ends of the taper. longitudinal Stem 74 of cylinder 71 is rotatably mounted within a bushing 84 which in turn is disposed within a bore 86 or cap 26b as illustrated. Sealing means are also provided between an upper portion of bore 28 and support 31, here in the form of an O-ring 87.

To prevent excessive accumulation of resin material on the exit side of orifice 16, base 26a and cap 26b may be provided with circumferentially extending grooves 93 and 94 so as to reduce the area of surfaces 46 and 47 adjacent the orifice and thereby inhibit accumulation of material thereon.

As the resin is delivered to cavity 27 of head 11 in a melted viscous condition at an optimum temperature, it is important to maintain this optimum temperature at the extruding orifice. For this purpose and as disclosed in my copending application, Ser. No. 286,116 for "Film Forming Head," head 11 may be equipped with heater elements (not shown) mounted on the base 26a and cap 26b. The resin material may thus be accurately maintained at the optimum extruding temperature, which may be for example, 400°F., up until the moment of discharge outwardly of orifice 16.

It is understood that the present invention has been disclosed by reference to particular and preferred embodiments thereof, and that modifications and design changes may be made to the disclosed embodiments without departing from the scope of the invention as defined in the accompanying claims.

I claim:

1. A film forming head for extruding a biaxially oriented film with weakened tear line, comprising head structure defining a cavity for receiving viscous resin material under pressure, means including a thin-lip orifice extending about a curvilinear portion of the cavity for extruding a biaxially oriented film that is wider than the orifice, and means for obstructing the flow of said resin outwardly of said orifice during extrusion at a location where the resin flow is bi-directional, whereby the extruded biaxially oriented film is formed with at least one weakened tear line.

2. A film forming head as set forth in claim 1 further including a second means for obstructing the flow of said resin outwardly of said orifice during extrusion at a location where the flow is bi-directional and spaced from and out of alignment with said first means considered with respect to the flow direction at said location so as to form a pair of weakened tear lines in the extruded film whereby the resin material between such lines may be torn as a strip away from the remainder of the film.

3. The combination in claim 1, said obstruction means comprising; a pin member disposed with a portion thereof obstructing flow of resin material at said orifice.

4. The combination of claim 3, further defined by said member being arranged with said portion inwardly of the discharge side of said orifice.

5. The combination of claim 4, further defined by said member portion being disposed within said cavity proximate the cavity side of said orifice.

6. The combination of claim 5, further comprising; a second such pin member having a portion thereof disposed within said cavity proximate the entry side of said orifice and spaced from the first named pin so as to form a pair of weakened tear lines.

7. The combination of claim 4, further defined by the said pin member having its axis extending generally transversely to a plane defined by said orifice.

8. In a film forming head for receiving viscous resin material under pressure and forming a resin film therefrom wider than the head, including a body having a central cavity formed therein with an interior wall which is concave in a plane passing through said body, the exterior of said body being formed with a surface which is convex in said plane and generally parallels said interior cavity wall, an extruding orifice extending between said exterior surface and interior wall and being elongated in said plane so as to circumferentially extend along said exterior surface and interior wall, the improvement in said head comprising; at least one obstruction means disposed proximate to or within said orifice intermediate the circumferential extent thereof for obstructing a spreading flow of resin material adjacent said orifice and forming a weakened tear line in the resultant film along the length thereof.

9. In the film forming head as set forth in claim 8 wherein said orifice has confronting gapped faces substantially parallel to said plane and at least one of said faces defines a lip connecting said exterior surface with said interior cavity wall, the improvement further defined by said obstruction means being a pin member disposed so as to extend generally perpendicularly to said faces.

10. In the head of claim 9 wherein said cavity is formed by said interior wall and by another interior wall connected to the face of said orifice confronting said lip, said walls defining a central cavity region of greatest cross section remote from said orifice, said wall connected to said lip being sloped from said central cavity region toward said plane to its circumferential connection with said orifice lip whereby said walls converge from said central cavity region toward said orifice to provide for smooth acceleration of the viscous resin material prior to being projected outwardly from said orifice, and the improvement being further defined by said pin member being disposed on or adjacent to said lip.

11. A film forming head for extruding a biaxially oriented film with a weakened tear line, comprising head structure defining a cavity for receiving viscous resin material under pressure, means including a thin-lip orifice extending about a curvilinear portion of the cavity for extruding a biaxially oriented film that is wider than the orifice downstream therefrom, and means for obstructing the flow of said resin outwardly of said orifice during extrusion at a location upstream from where the film reaches its maximum width to form a weakened tear line along the length of the biaxially oriented film.

* * * * *